UNITED STATES PATENT OFFICE.

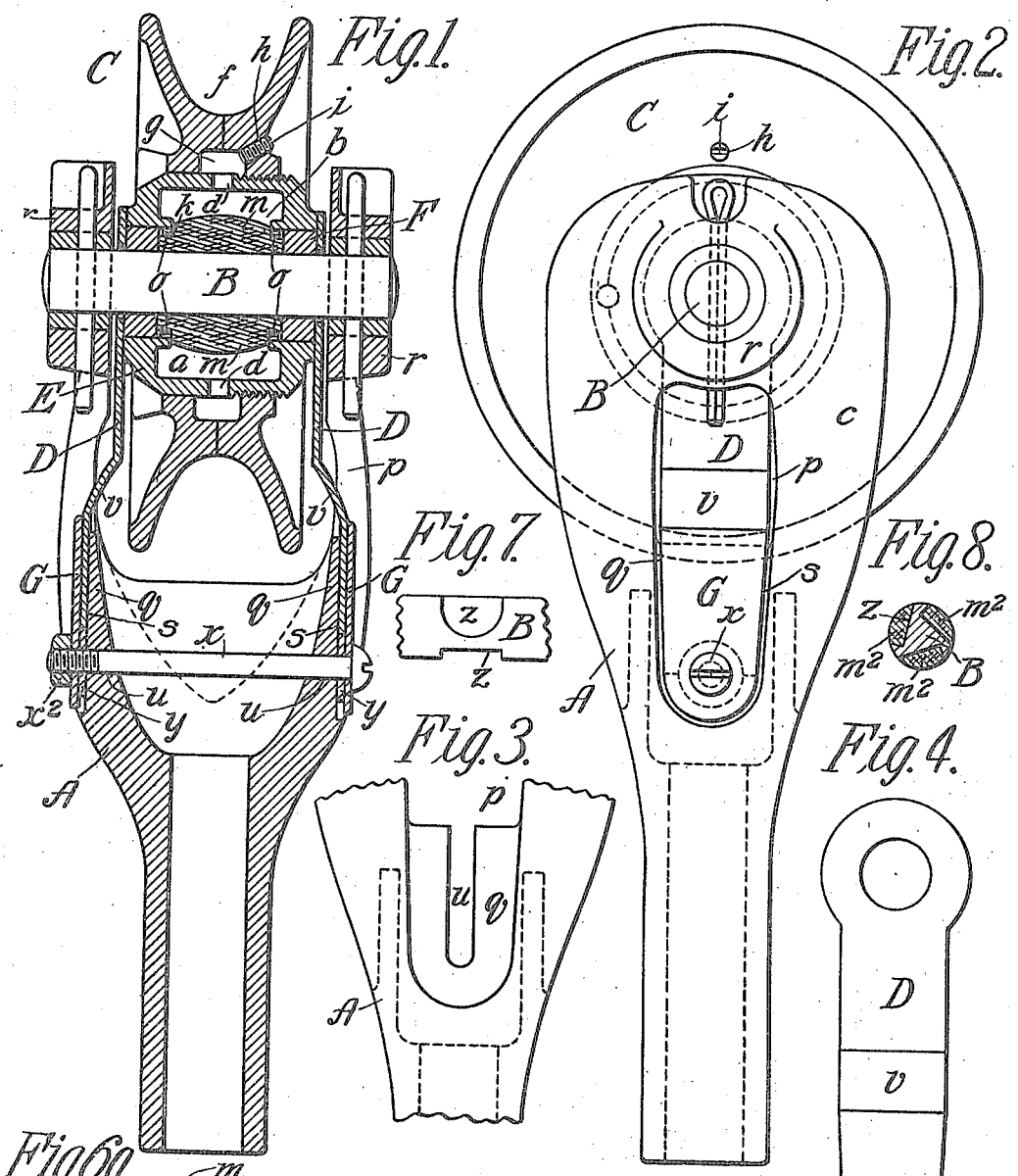

LEWIS J. TETLOW, OF SPRINGFIELD, MASSACHUSETTS.

TROLLEY-WHEEL.

1,257,652.   Specification of Letters Patent.   Patented Feb. 26, 1918.

Substitute for application Serial No. 829,502, filed April 4, 1914. This application filed November 21, 1917. Serial No. 203,276.

*To all whom it may concern:*

Be it known that I, LEWIS J. TETLOW, a citizen of the United States of America, and resident of Springfield, in the county of Hampden and State of Massachusetts, have invented certain new and useful Improvements in Trolley-Wheels, of which the following is a full, clear, and exact description.

This invention relates to improvements in trolleys for use on electric railway cars, and a principal object thereof is to provide improved means between the trolley wheel and the supporting axle therefor whereby the axle will be amply lubricated, without waste of the lubricant furnished within the chambered body of the trolley wheel.

This application is a substitute of abandoned application Serial 829,502.

Other objects are to improve the trolley in respect to minor details of construction for the increased efficiency thereof.

The invention is described in conjunction with the accompanying drawings and is set forth in the claims.

In the drawings,—

Figure 1 is a central vertical sectional view through the complete improved trolley, taken on the plane of the axis of the trolley wheel.

Fig. 2 is a side elevation of the trolley.

Fig. 3 is a partial side elevation comprising the base portion of the harp or head.

Fig. 4 is a side view of one of the contact springs.

Figs. 5 and 6 are respectively side and end views of the bushing comprised in the axle bearing central portion of the wheel.

Fig. 6$^a$ is a diagrammatic view to more particularly bring out a construction and arrangement hereinafter particularly referred to.

Figs. 7 and 8 are respectively a partial side view of the axle and a cross section of the same showing a modification pertaining to the means for lubrication of the wheel bearing.

Similar characters of reference indicate corresponding parts in all of the views.

In the drawings:—A represents the trolley harp carrying the axle B on which the trolley wheel C is mounted for rotation as usual,— D D representing the contact springs.

The trolley wheel comprises a hub portion E constructed with an annular lubricant chamber $a$ therein which has an annular opening or mouth, as represented by $b$ leading inwardly from the chamber to the central aperture of the hub.

The said hub also has duplicated apertures or ports $d$ leading from its chamber outwardly through its circumferential wall.

The wheel comprises the outer grooved rim $f$, having an annular chamber $g$ therein with which said passages $d$ of the hub communicate.

$h$ represents a duct leading sidewise through the cheek of the rim portion of the wheel for which the closing screw plug $i$ is provided; so that upon the temporary removal of such screw plug a heavy oil or other appropriate lubricant may be supplied into the interior of the wheel whenever occasion therefor may require.

F represents an annular bushing to tightly fit in the hub, the same having elongated slots $j$ through its intermediate portion and extending from its central bore to its periphery.

The said bushing is made with external or peripheral grooves $k$ $k$, located somewhat inside of the ends of, and intersecting the slots $j$ as particularly shown in Fig. 5.

$m$ $m$ represent blocks or members of felt or similar absorbent material forced with a comparatively close fit in the said slots of the bushing and having their inner edges in contact bearing upon the intermediate portion of the axle B for supplying an ample but not wasteful lubrication to the axle bearing.

The said felt or other absorbent members $m$ are retained against outward displacement by keepers therefor sunk within the aforementioned annular grooves $k$ in the periphery of the bushing.

The retaining means just above referred to may consist of fine wire, stout thread, or catgut $o$ wound around the bushing within the grooves thereof and engaging the absorbent members at the portions thereof near their ends.

The ends of the wire, etc., after being tightly wound may be confined by a knot or twisting.

As represented in Fig. 6$^a$, the strand or a convolution thereof may be caused to penetrate the thicknesses of the several blocks of felt, thereby forming a tie for the latter, positively uniting them to the bushing and preventing any actual disengagement of the blocks in either an outward direction or an inward direction, at times of or previous to the assemblage of the parts or during the utilization of the trolley as an entirety.

Previous to the assemblage of the wheel having the bushing made and equipped as described and shown, the absorbent blocks are positioned within the slot so that their inner edges slightly protrude within the bore of the bushing. When the axle is forced through the wheel, as the latter is being mounted in the harp, the axle, by reason of the somewhat rounded formation of the end thereof, slightly outwardly crowds the blocks for its accommodation in and through the bushing bore, thereby assuring positive contact between the absorbent members and the axle.

The harp A has apertures $p$ extending entirely through the thickness of the opposite side jaws $c$ thereof between the upstanding base portions $q$ and the axle supporting portions $r$ of such jaws.

The said upstanding base portions $q$ have shallow recesses $s$ within the outer faces thereof, and such recessed upstanding portions have transverse openings $u$, therethrough.

The contact springs D are formed with offsets $v$ in intermediate portions of their lengths, so that their shanks engage in the shallow recesses at the outer faces of the harp jaws while their extremities are disposed inwardly relatively to the axle supporting portions $r$ of the jaws.

The shank portions of the contact springs have recesses $w$ opening to their lower ends.

G G represent clamping plates having bolt holes through their lower end portions, and these clamping plates are also disposed in said shallow recesses, and between which and the inner walls of the recesses the shanks of the springs may be detachably engaged.

A headed bolt $x$ for which a nut $x^2$ is provided has the shank thereof passed through the clamping plates and freely within the apertured shanks of the contact springs; and through the openings $u$ in the harp jaws so that the head and nut thereof exert, through the medium of the clamping plates, binding engagements upon the shank portions of the springs.

$y$ represents spacing washers encircling the bolt and located in said shallow recesses between the clamping plates and the inner wall of the recesses.

These spacing washers are of the same thickness as the shank of the contact springs (or practically one or two thousandths of an inch less than such thickness), so that in practice after the bolt tensioning on the clamping plates has been effected or adjusted, the contact springs, when the axle is displaced, may be drawn out from place or inserted in place by the exercise of a sufficient degree of pulling or forcing strain and without the necessity of the employment of tools or implements,—it being appreciated in this connection that the walls of the shallow recesses and the clamping plates, spaced by the washers from such walls, form pockets into which, and from which, the shanks of the contact springs may be forced under frictional engagement or tension, and withdrawn.

The modification of the lubricating expedient for the wheel disclosed in Figs. 7 and 8, is seen to consist in the construction of the intermediate portion of the axle with one or more cavities $z$ opening to the periphery, in which sections $m^2$ of felt or like absorbent and lubricant containing material are pocketed,—the exterior of the absorbent material protruding entirely to the peripheral contour of the axle.

These sections $z$ may be reliably retained in place by a suitable adhesive material such as shellac, while, moreover, the surrounding walls of the cavities measurably serve as retainers for such sections.

I claim:—

1. A trolley wheel comprising a hub portion made with a central bore and with a lubricant chamber therein, and having an opening leading radially inwardly from said chamber to the central opening thereof, an annular bushing in said hub made with one or more elongated slots through its intermediate portion, and extending from its periphery to the bore thereof, and having a peripheral groove intersecting the slots, an axle fitting through the bushing, members of absorbent material in said slots of the bushing for conducting lubricant from the chambered trolley wheel, through the bushing, and means located in said groove for restraining said absorbent members against undue outward displacement.

2. A trolley wheel comprising a hub portion made with a lubricant chamber therein, and having an opening leading inwardly from said chamber to the central opening thereof, an annular bushing in said hub made with slots through its intermediate portion, and extending from its periphery to the bore thereof, and having peripheral grooves intersecting the slots adjacent the ends thereof, an axle fitting through the bushing, members of absorbent material in said slots of the bushing for conducting lubricant from the chambered hub to the axle, and encircling bands sunk in the bushing within said grooves, and engaging said absorbent members.

3. A trolley wheel comprising a hub portion made with a lubricant chamber therein, and having an opening leading inwardly from said chamber to the central opening thereof, an annular bushing in said hub made with slots through its intermediate portion, and extending from its periphery to the bore thereof, and having peripheral grooves intersecting the slots adjacent the ends thereof, an axle fitting through the bushing, members of absorbent material in said slots of the bushing for conducting lubricant from the chambered hub to the axle, and strands encircling the bushing, sunk within the annular grooves thereof, and passed through end portions of the absorbent members.

4. A trolley wheel comprising a hub portion constructed with an annular lubricant chamber therein which has an opening leading inwardly from said chamber to the central aperture of the hub and having one or more passages leading from said chamber to its periphery, an annular bushing in said hub having apertures through its central portion, a grooved rim detachably secured to the said hub portion, having an internal annular chamber therein with which said passages of the hub communicate, an axle fitting through the bushing, members of absorbent material within said apertures of the bushing for conducting lubricant from the chambered hub to the axle, and a passage extending through the side of said rim portion for the introduction of lubricant into the wheel and means for closing said passage.

Signed by me at Springfield, Mass.

LEWIS J. TETLOW.

Copies of this patent may be obtained for five cents each, by addressing the "Commissioner of Patents. Washington, D. C."